(12) United States Patent
Pack et al.

(10) Patent No.: US 7,800,736 B2
(45) Date of Patent: Sep. 21, 2010

(54) SYSTEM AND METHOD FOR IMPROVING LIDAR DATA FIDELITY USING PIXEL-ALIGNED LIDAR/ELECTRO-OPTIC DATA

(75) Inventors: Robert Taylor Pack, Logan, UT (US); Scott E. Budge, Logan, UT (US)

(73) Assignee: Utah State University, North Logan, UT (US)

( * ) Notice: Subject to any disclaimer, the term of this patent is extended or adjusted under 35 U.S.C. 154(b) by 0 days.

(21) Appl. No.: 12/195,921

(22) Filed: Aug. 21, 2008

(65) Prior Publication Data

US 2009/0027651 A1 Jan. 29, 2009

Related U.S. Application Data

(62) Division of application No. 11/244,212, filed on Oct. 5, 2005, now Pat. No. 7,417,717.

(51) Int. Cl.
*G01C 3/08* (2006.01)

(52) U.S. Cl. .................. 356/4.01; 356/4.1; 356/5.01; 356/5.1; 356/5.15

(58) Field of Classification Search ....... 356/3.01–3.15, 356/4.01–4.1, 5.01–5.15, 6–22
See application file for complete search history.

(56) References Cited

U.S. PATENT DOCUMENTS

| 4,671,650 | A  | * | 6/1987 | Hirzel et al. ............... 356/28 |
| 7,215,430 | B2 |   | 5/2007 | Kacyra et al. ............. 356/601 |
| 2002/0060784 | A1 | * | 5/2002 | Pack et al. ................ 356/6 |
| 2005/0110621 | A1 | * | 5/2005 | Hahn et al. ............... 340/435 |

\* cited by examiner

*Primary Examiner*—Thomas H Tarcza
*Assistant Examiner*—Luke D Ratcliffe

(57) ABSTRACT

A lidar and digital camera system collect data and generate a three-dimensional image. A lidar generates a laser beam to form a lidar shot and to receive a reflected laser beam to provide range data. A digital camera includes an array of pixels to receive optical radiation and provide electro-optical data. An optical bench passes the laser beam, reflected laser beam, and optical radiation and is positioned to align each pixel to known positions within the lidar shot. Pixels are matched to form a lidar point-cloud which is used to generate an image.

5 Claims, 6 Drawing Sheets

SYSTEM AND METHOD FOR IMPROVING LIDAR DATA FIDELITY USING PIXEL-ALIGNED LIDAR/ELECTRO-OPTIC DATA

RELATED APPLICATIONS

This application claims the benefit of and is a divisional of co-pending U.S. patent application Ser. No. 11/244,212 filed on Oct. 5, 2005.

TECHNICAL FIELD

The present invention relates to three-dimensional modeling. More specifically, the present invention relates to a system and method that incorporates a lidar to perform three-dimensional imagery in real time.

BACKGROUND OF THE INVENTION

Lidar (light detection and ranging) uses laser technology to make precise distance measurements over long or short distances. One application of lidar is the range scanner, or scanning lidar. Lidar transceivers operate on the principle of transmitting laser light that then reflects off of a given object and returns to a lidar receiver. The distance to an object is then determined by analyzing the laser signal through various techniques. During the scanning process, the lidar makes repeated range measurements to objects in its path. Through repeated measurements of an object by individual laser transmissions, the shape of the object can be determined. The resulting range data is collected and serves as a rough model of the scanned area.

In many applications, obtaining high-resolution, high-fidelity shape information is desirable. Physical limitations of the range scanner constrain the maximum spatial resolution of the range data, which decreases with distance from the range scanner. At large distances, the range scanner may not be able to discern surface details of an object. Thus, it would be an advancement in the art to improve the ability to achieve an increased resolution of shape information obtained by lidar transceivers from long distances.

BRIEF DESCRIPTION OF THE DRAWINGS

Various embodiments of the invention are now described with reference to the figures, in which.

DETAILED DESCRIPTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

Figure 1:
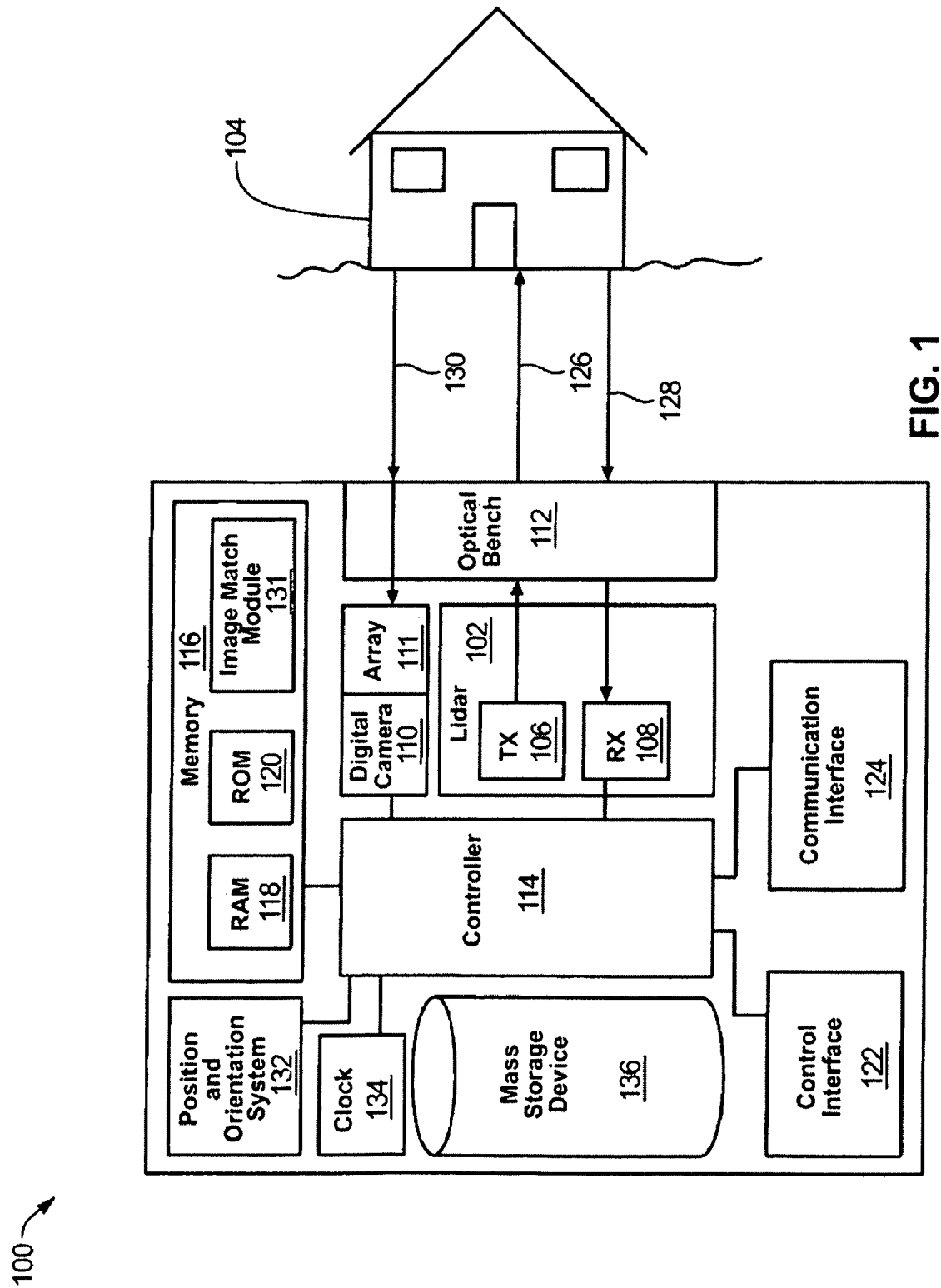
FIG. 1 is a block diagram illustrating a system for collecting lidar and electro-optical data.

Referring to FIG. 1, a block diagram of an image capture system 100 is shown. The system includes a lidar 102 for scanning an object 104 to generate range data, i.e., distance measurements from the lidar 102 to real-world objects. The object 104 may be any indoor or outdoor three-dimensional region to which distance measurements can be made using the lidar 102. By way of example, the lidar 102 may be embodied as an LMS 291, manufactured by SICK AG of Waldkirch, Germany, although various other models are contemplated. The lidar 102 includes a lidar transmitter 106 to transmit laser radiation and a lidar receiver 108 to capture and convert received laser radiation.

The system 100 includes a high-resolution, high-speed digital camera 110 for obtaining digital images of the object 104 during an imaging process. The digital camera 110 may include an ISG LightWise LW-3-S-1394™. camera manufactured by Imaging Solutions Group of NY. The digital camera 110 includes an electro-optic (EO) detector array 111 that generates EO pixels for a field-of-view. The EO detector array 111 captures various forms of active and passive optical radiation.

The system 100 includes an optical bench 112 to pass and direct radiation. The optical bench 112 may include a plurality of optics that operate specific to the lidar 102 and the digital camera 110.

The system 100 includes a controller 114 that directs operation of the system components. The controller 114 may be embodied as a microprocessor, microcontroller, digital signal processor (DSP), or other control device known in the art. The controller 114 is coupled to a memory 116 that may include a random access memory (RAM) 118 and a read only memory (ROM) 120 or the like. The memory 116 buffers range data and digital images during the imaging process. The memory 116 may also be used to store parameters and program code for system operation.

The controller 114 is in electrical communication with a control interface 122 to enable user interaction. The control interface 122 may be implemented as a universal serial bus (USB) interface, RS-232 interface, or wireless interface, such as an 802.11b interface or infrared (IR) receiver. In one embodiment, the controller 114 may further be in communication with a communication interface 124 for transmitting captured range data, digital images, and 3D images. The communication interface 124 may include, for instance, an Ethernet adapter, a IEEE 1349 (Firewire) adaptor, a USB adaptor, or other high-speed communication interface.

In operation, the controller 114 instructs the lidar transmitter 106 to transmit laser radiation in the form of a laser beam 126 to the optical bench 112. The optical bench 112 directs the laser beam 126 to a specific solid angle within a field-of-view (FOV) of the lidar receiver 108 and digital camera 110. The directed laser beam 126 reflects off the object 104 and reflected laser radiation 128 returns to the optical bench 112. The optical bench 112 captures the reflected laser radiation 128 from the same solid angle of the FOV. The optical bench 112 directs the reflected laser radiation 128 to the lidar receiver 108 which converts the captured laser radiation 128 to electrical signals. The electrical signals are transmitted to the controller 114 that computes range data. The range data is based on the distance that the laser light traveled using techniques known to those skilled in the art, such as heterodyne or time-of-flight techniques.

At the same time the laser radiation is transmitted, the controller 114 instructs the digital camera 110 to collect optical radiation 130 from the same solid angle of the FOV. The solid angle within the FOV of the digital camera 110 encompasses the same solid angle within the FOV as the lidar transmitter 106 and the lidar receiver 108. The optical bench 112 captures the optical radiation 130 from the solid angle of the FOV. The optical bench 112 directs the captured optical radiation 130 to the digital camera 110. Once captured, the digital camera 110 converts the optical radiation 130 to electronic spectral data that is sent to the controller 114 for processing.

The controller 114 repeatedly commands the components to initiate the above-described sequence in a manner such that the range data and electronic spectral data are generated in sequence. Range data and electronic spectral data are assembled together by an image match module 131 to construct an image. In this manner, the controller 114 sequentially builds a spectrally textured range image. The position of a spectrally textured range image in space is known relative to the optical axis of the optical bench 112. The controller 114 rectifies the relative position and orientation of a spectrally textured range image to a relative position and orientation within a local coordinate system.

The system 100 may include a position and orientation system 132 to generate position and orientation data with respect to the Earth. The position and orientation system 132 may provide a bearing or heading (azimuth) of the system 100. Azimuth is typically expressed as a horizontal angle of the observers bearing, measured clockwise from a referent direction, such as North. A position and orientation system 132 may include a high-accuracy compass capable of digital output. In certain implementations, the position and orientation system 132 may provide the tilt or inclination of the lidar 102 with respect to the Earth's surface. For example, the lidar 102 may be tilted with respect to one or two axes. For simplicity, however, the following exemplary embodiments assume that the lidar 102 is level prior to scanning.

The controller 114 receives the position and orientation data with respect to the Earth and rectifies the relative position and orientation of the spectrally textured range image to a global coordinate system. A clock 134 provides a timing signal to the controller 114 and the position and orientation system 132, to ensure the system position and orientation is known at the exact time of the data acquisition.

Following the rectification, the controller 114 converts a spectrally textured range image into a 3D image patch. The 3D image patch may be stored in a mass storage device 136, such as a hard disk drive, optical storage device (e.g., DVD-RW) memory. The mass storage device 136 may be construed to include any combination of volatile, non-volatile, magnetic, or optical storage media.

An object shape is represented by a multitude of 3D points derived from the processing of lidar signals. The 3D points are collectively referred to herein as a point-cloud. Techniques and implementations disclosed herein improve the ability to obtain high-fidelity, high-resolution lidar point-clouds without the use of improved lidar technology or improved platform stabilization technology.

Figure 2:
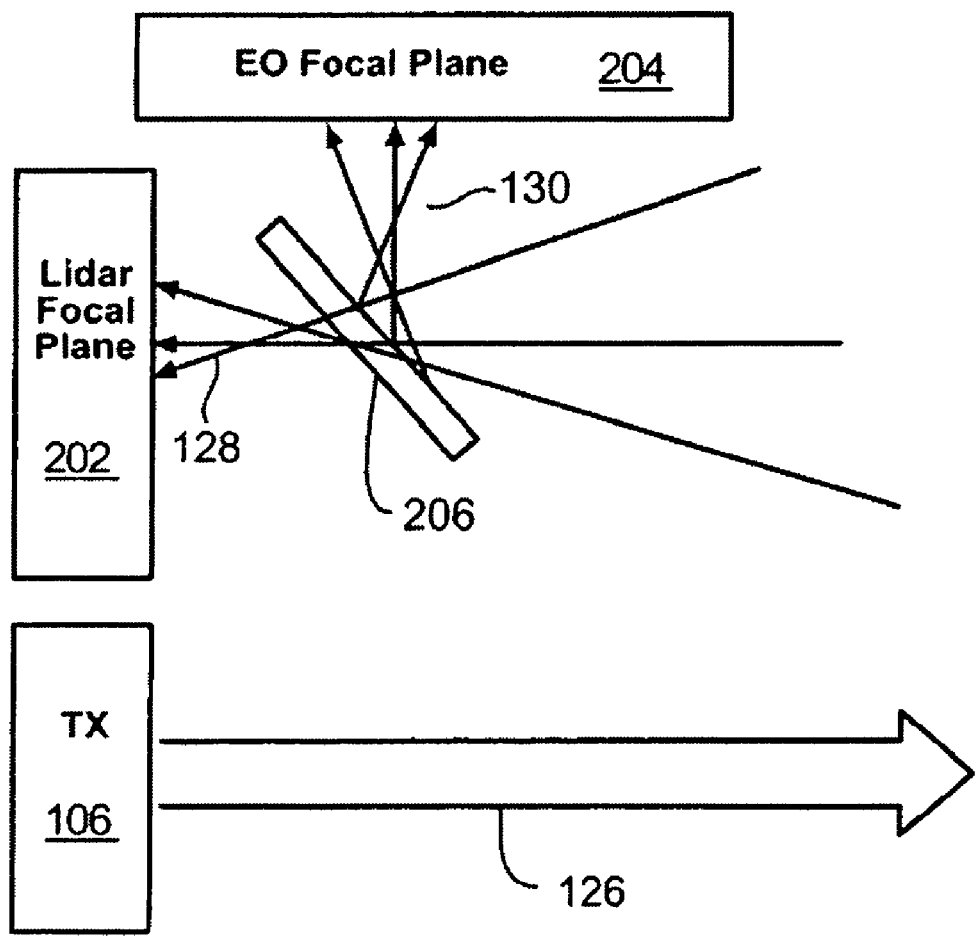
FIG. 2 is a diagram illustrating focal planes of a system for collecting lidar and electro-optical data.

Referring to FIG. 2, a diagram illustrates one optical design 200 for the system 100. As can be appreciated, numerous optical designs may be implemented, and the illustration of FIG. 2 is for illustrative purposes only. The optical design 200 provides both a lidar focal plane 202 and an EO focal plane 204. An optic 206 may be incorporated, such as within the optical bench 112, to direct captured radiation to the respective planes 202, 204. The EO focal plane 204 detects any form of active or passive optical radiation collected on detectors positioned on a focal plane. In the system 100, the EO focal plane 204 coincides with the digital camera 110, and the lidar focal plane 202 coincides with the lidar receiver 108.

The optical bench 112 aligns the focal planes 202, 204 such that the lidar 102 and the digital camera 110 are aligned as long as their subtended angles are within the FOV. Accordingly, the alignment of a laser beam 126 is automatically matched or aligned with the optical radiation 130 sensed by the digital camera 110 that generates EO pixels for the same FOV. Thus, if a transmitted laser beam 126 casts a footprint on an object in the FOV, the corresponding pixels on the EO focal plane 204 that are directed at the same object are immediately and unambiguously known. The lidar footprint and the EO pixels are thus aligned at the pixel level (pixel-aligned). The EO detector array 111 and the lidar receiver 108 generate image data that is read from the same portion of the FOV at the same time.

Figure 3:
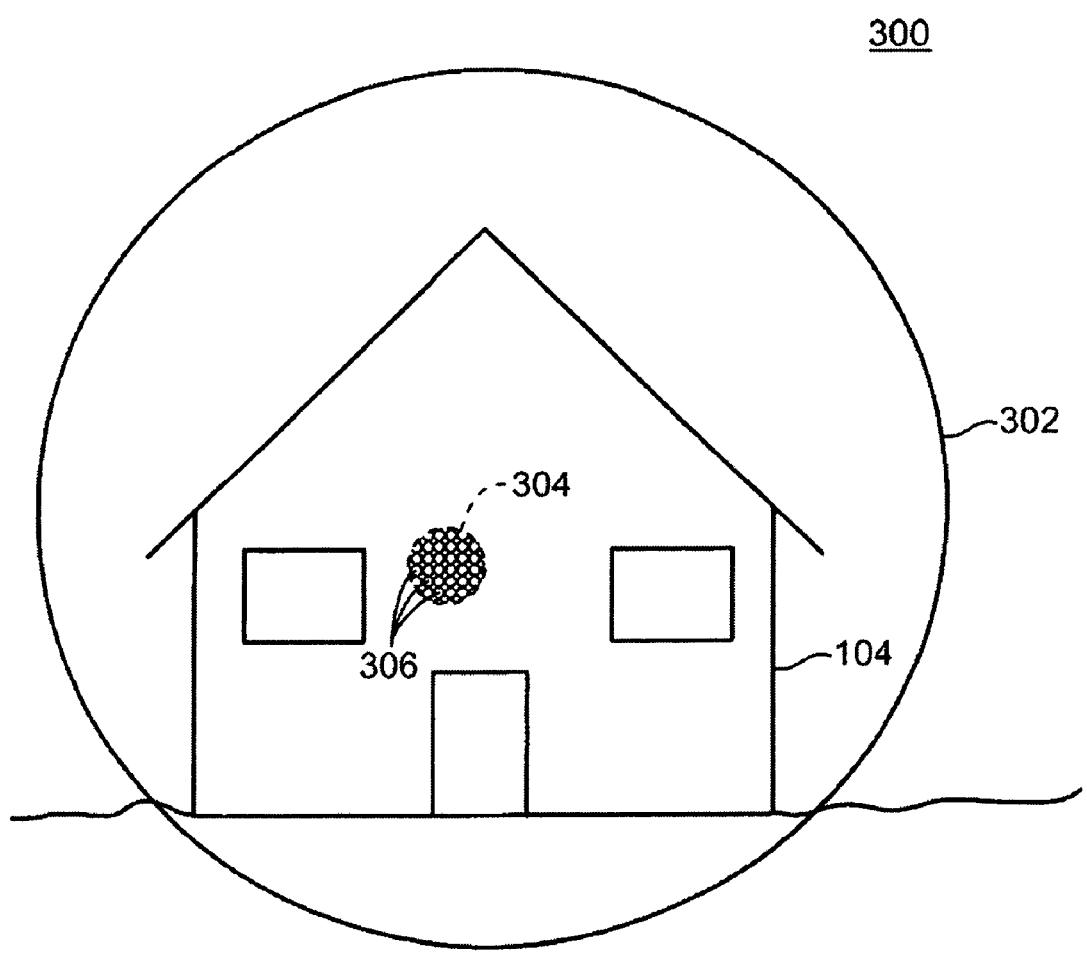
FIG. 3 is a diagram illustrating a lidar shot on an object.

Referring to FIG. 3, a layout 300 illustrates a FOV 302 of a system 100 relative to an object 104. As can be appreciated, the object 104 may be entirely or partially encompassed within a FOV 302. A single lidar shot 304 that casts a footprint upon the object 104 is illustrated. The EO detector array 111 is designed such that a single lidar shot 304 corresponds to a plurality of aligned EO pixels 306. The controller 114 identifies each EO pixel 306 falling within the lidar shot 304. The system 100 may be designed such that dozens or hundreds of EO pixels 306 of the array 111 fall within the single lidar shot 304. This enables the draping of detailed spectral information onto a relatively coarse surface shape defined by the aligned but more broadly spaced 3D points measured by the lidar 102. The pixel-alignment of an EO detector array 111 with a lidar 102 allows for generation of very high resolution point-cloud. As can be expected, multiple lidar shots 304, each including a plurality of EO pixels 306, are required to properly image an object 104.

Figure 4:
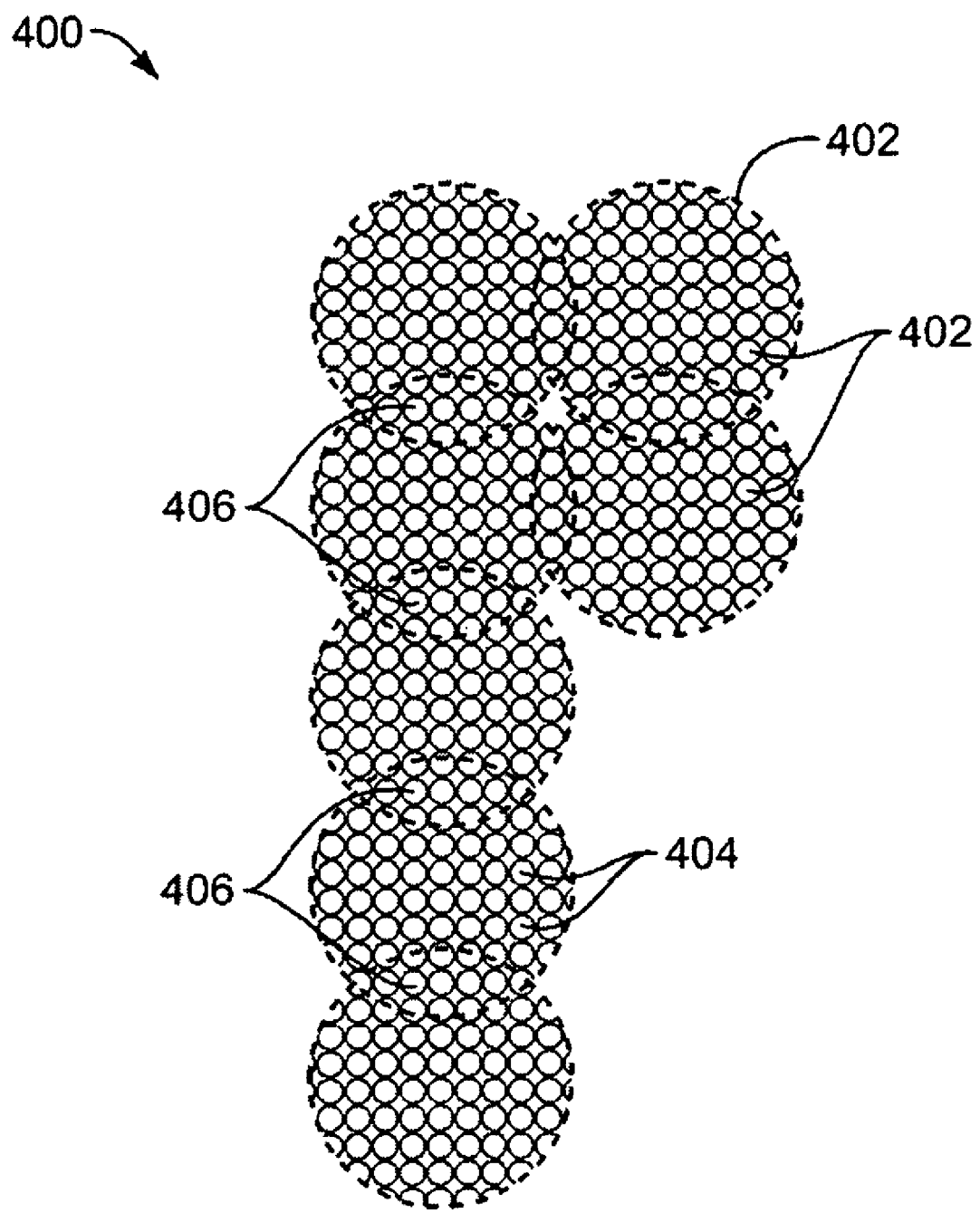
FIG. 4 is a diagram illustrating multiple lidar shots.

Referring to FIG. 4, a layout 400 illustrates a plurality of lidar shots 402 that may be taken in rapid succession. A plurality or array of lidar shots 402 may be acquired through the use of a lidar 102 or an array of lidars 102. Each lidar shot 402 is representative of a 3D point, and each lidar shot 402 includes a plurality of aligned EO pixels 404. The EO pixels 404 have a higher spatial resolution than the lidar shot 402. The lidar shots 402 may include overlap areas 406 relative to one another. The image match module 131 identifies pixels 404 within overlap areas 406 and arranges lidar shots 402 relative to one another. A sufficient number of 3D lidar shots 402 may be arranged together to form a lidar point-cloud.

Figure 5:
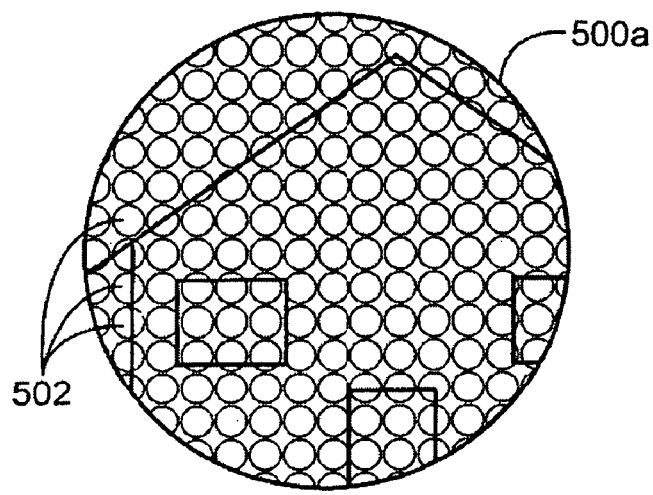
FIG. 5 is a diagram illustrating multiple lidar point-clouds.
Figure 5:
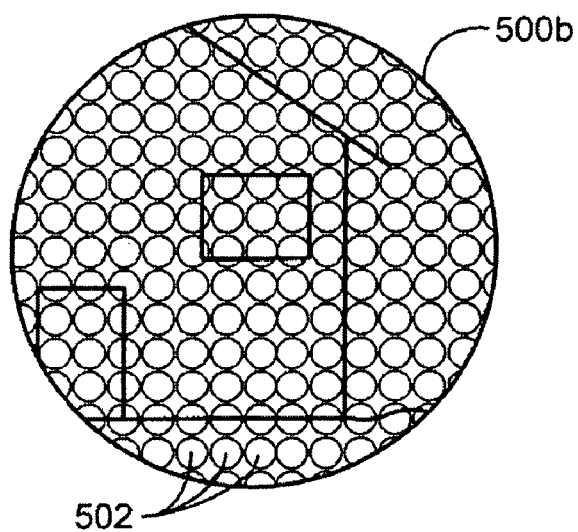
Figure 5:
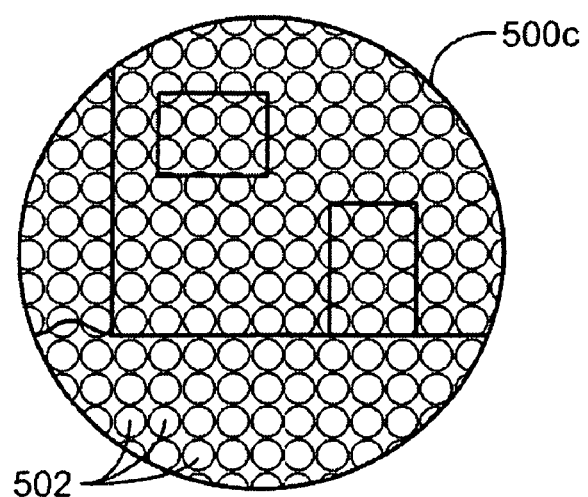

Referring to FIG. 5, a series of lidar point-clouds 500*a-c* are shown. Each lidar point-cloud 500*a-c* includes a plurality of lidar shots 502, with each lidar shot 502 including a plurality of aligned EO pixels. The lidar point-clouds 500*a-c* illustrate different views of an object and may be merged to realize the entire object.

A resolution of a first point-cloud may be coarse, but as more lidar shots are taken, the image increases in resolution. Data collection may be repeated to obtain a second set of data for the same or partially overlapping area within the FOV. The second set of data may be from a slightly different view point. Thus, two point-clouds may be for the same or partially overlapping area. By combining coarser images given by point-clouds, a finer resolution is realized. By overlaying point-clouds, fewer views may be required to receive the same detail.

If the change in view point is significant, the controller 114 merges two partially overlapping point-clouds using the image match module 131 that operates in real time to provide 2D image matching. The image match module 131 may match overlapping point-clouds by EO pixel-to-pixel comparison.

Given the image matching results, the image match module 131 generates a pointing error. Based on the pointing error, the controller 114 applies corrections for errors in position, orientation, and/or time that occurred between the two data collections. Following the pointing error correction, platform position and orientation data along with sensor pointing data are used to combine two point-clouds into one higher resolution point-cloud.

Data collection and image matching are repeated to add additional point-clouds. The additional point-clouds are aligned with the previous point-clouds. As long as the system 100 can continue pointing at and collecting lidar data from an object 104, a point-cloud may be refined.

The accuracy of the merging of multiple point-clouds is directly correlated with the resolution of the EO images being used and the accuracy and robustness of the image match module 131. For example, a system 100 may be designed with a lidar 102 having a 100 microradian spatial resolution, and a digital camera 110 with pixels that subtend 10 microradians in each dimension. If the 10 microradian pixels for two successive images are matched to an accuracy of about one pixel, the resulting 10 or so microradians of relative pointing data may then be used to correct the pointing error of the system and thereby more accurately merge two point-clouds. An original point-cloud density of 100 shots per square milliradians (100 shots per square meter at a distance of 1000 meters) could be effectively improved to 200 shots per square milliradians. Even more shots per square milliradians may then be accumulated through the merging and accumulation of subsequent point-cloud datasets.

Figure 6:
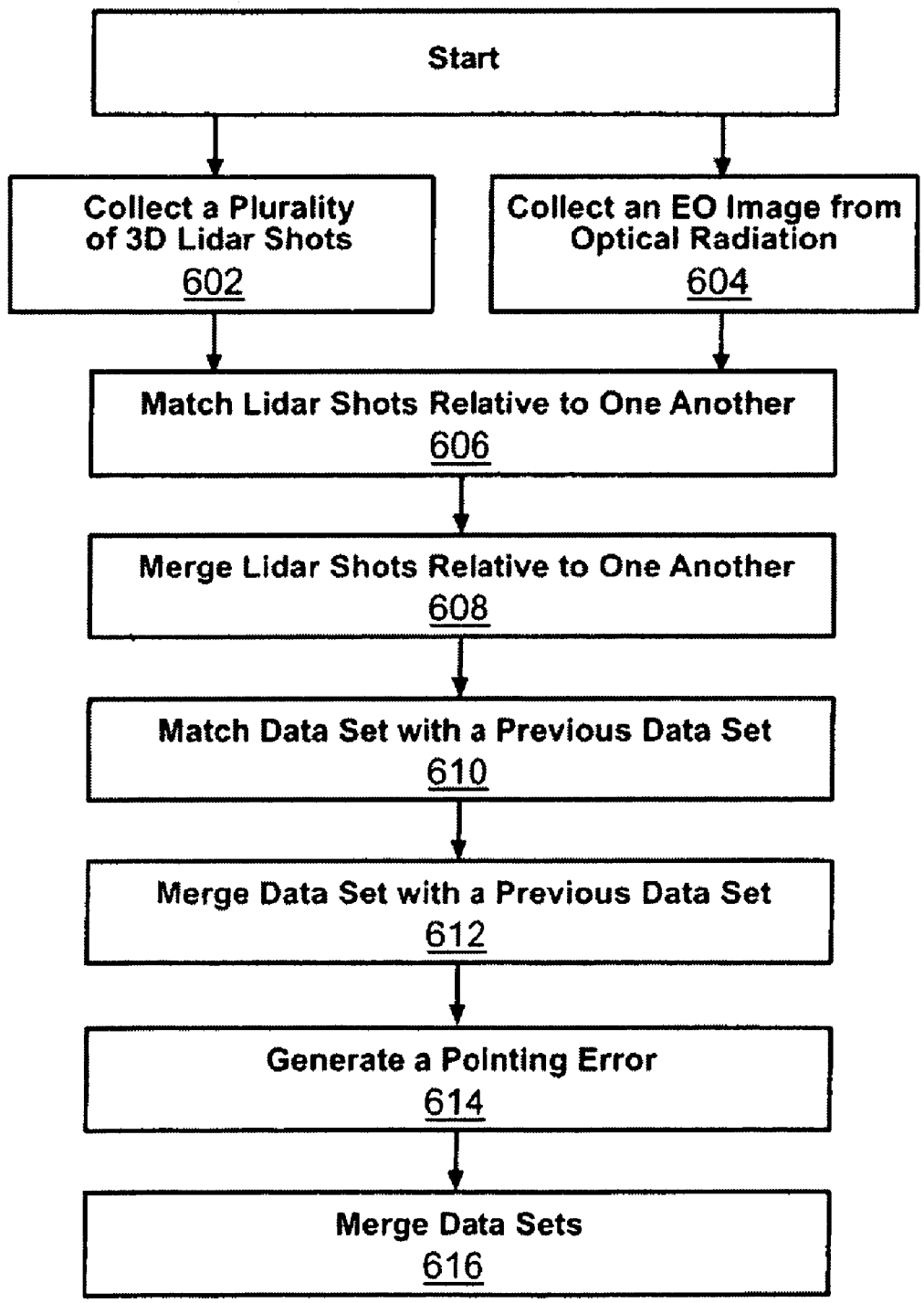
FIG. 6 is a flow diagram illustrating a technique for collecting lidar and electro-optical data to generate an image.

Referring to FIG. 6, a flow diagram 600 illustrates an embodiment of a process performed by the present invention. A lidar, or an array of lidars, collects 602 a plurality of 3D lidar shots which form a lidar point-cloud. Approximately simultaneously to the lidar point-cloud data collection, a digital camera collects 604 an EO image from optical radiation. The EO image typically has a higher resolution than the lidar point-cloud. The EO image includes multiple pixels, with each pixel aligned with the point-cloud data. The data collection for the lidar point-cloud and the EO image is preferably completed in sufficient time so as to not suffer the effects of object or scene motion within the FOV.

Data collection in steps 602 and 604 may be repeated to obtain one or more additional data sets. An additional data set may correspond to the same area as a first data set and, therefore, be an overlaying lidar point-cloud. An additional data set for a lidar point-cloud may also correspond to an overlapping area. By taking multiple data sets of the same area, an initially course image may be refined to provide an image with high resolution. Thus, by use of a system with a high resolution digital camera and a low resolution lidar, a high resolution lidar data set and combined image is achieved. Such a system is less expensive and more reliable than one incorporating a high resolution lidar.

Multiple lidar shots may partially or fully overlap one another. The image match module 131 identifies and matches 606 lidar shots relative to one another. Once the lidar shots are matched, the image match module 131 is able to merge 608 lidar shots relative to one another. The image match module 131 matches 610 a data set with a previous data set. The data set and previous data set are then merged 612 together.

After the imaging matching and merging, the controller 114 generates 614 a pointing error and corrects that error that occurred between data collection times. The controller 114 then merges 616 all data sets to generate a final image. Overlapping data sets are thereby merged into a single higher resolution lidar point-cloud. Overlapping data sets are merged into a single lidar point-cloud to increase the point cloud and image size and increase resolution for the overlap areas. Additional data sets collected from slightly different viewpoints are effective in further refining a point cloud and an image.

Data collection and merging may be repeated for additional data sets to build and refine an image. A system may continue collecting data as long as a target of interest remains within the FOV. As an object is refined over multiple data set collections, data collection may commence from a greater distance. By overlaying and merging data collections, a high resolution image is developed with multiple "course" data collections rather than one fine image.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A method for generating a three-dimensional image, comprising:
    aligning pixels in an electro-optical array with a lidar such that the pixels are positioned within a lidar shot formed by the lidar;
    acquiring a plurality of lidar shots, wherein each lidar shot is associated with a plurality of aligned pixels and is acquired by,
       the lidar transmitting a laser beam to form a lidar shot,
       the lidar receiving a reflected laser beam indicative of range data, and
       the electro-optical array receiving optical radiation indicative of electro-optical data, wherein the electro-optical data corresponds to aligned pixels within the lidar shot;
    arranging the plurality of lidar shots relative to one another using the aligned pixels associated with the plurality of lidar shots;
    forming a first point-cloud from the arranged plurality of lidar shots;
    merging the first point-cloud with a second point-cloud, the second point-cloud comprising a second plurality of lidar shots, each associated with a plurality of aligned pixels, and
    wherein the first point-cloud is merged with the second point-cloud using the aligned pixels associated with the lidar shots of the first point-cloud and the aligned pixels associated with the lidar shots of the second point-cloud.

2. A method for generating a three-dimensional image, comprising:
    aligning pixels in an electro-optical array with a lidar such that the pixels are positioned within a lidar shot formed by the lidar;
    acquiring a plurality of lidar shots, wherein each lidar shot is associated with a plurality of aligned pixels and is acquired by,
       the lidar transmitting a laser beam to form a lidar shot,
       the lidar receiving a reflected laser beam indicative of range data, and the electro-optical array receiving optical radiation indicative of electro-optical data, wherein the electro-optical data corresponds to aligned pixels within the lidar shot;

arranging the plurality of lidar shots relative to one another using the aligned pixels associated with the plurality of lidar shots;

forming a first point-cloud from the arranged plurality of lidar shots;

forming a second point-cloud from the arranged plurality of lidar shots;

wherein the first point-cloud is associated with first lidar position data and the second point-cloud is associated with second lidar position data, and wherein merging the first and second point-clouds comprises arranging the first point-cloud relative to the second point-cloud using the lidar position data associated with, the first and the second point-clouds.

3. The method of claim 2, wherein a footprint of one or more of the lidar shots of the first point-cloud overlap an area within a lidar footprint of one or more of the lidar shots of the second point-cloud, and wherein merging the first and the second point-clouds comprises refining the arrangement of the first point-cloud relative to the second point-cloud by image matching within the one or more overlap areas.

4. The method of claim 2, further comprising calculating a pointing error in the first and the second lidar position data using the image matching.

5. The method of claim 4, wherein the lidar position data comprises lidar position, lidar orientation, and lidar shot timing data.

* * * * *